United States Patent

Song et al.

[11] Patent Number: 5,409,748
[45] Date of Patent: Apr. 25, 1995

[54] HEAT RADIATING TUBE FOR ANNEALING FURNACE, WITH CERAMIC COATED ON THE INSIDE THEREOF

[75] Inventors: Jin W. Song, Pohang; Soon Y. Whang, Seoul; Byong K. Sung, Pohang, all of Rep. of Korea

[73] Assignees: Pohang Iron & Steel Co., Ltd.; Research Institute of Industrial Science & Technology, both of Kyong Sang Book-Do, Rep. of Korea

[21] Appl. No.: 815,078

[22] Filed: Dec. 27, 1991

[30] Foreign Application Priority Data

Dec. 31, 1990 [KR] Rep. of Korea ............... 90-22644

[51] Int. Cl.⁶ ............................................. B32B 15/04
[52] U.S. Cl. ................................ 428/34.4; 428/34.6; 428/469; 428/472; 428/472.1; 428/472.2; 428/586; 428/689; 428/697; 428/701; 428/702; 138/174; 138/177; 165/177; 165/180
[58] Field of Search ............... 428/668, 678, 632, 633, 428/652, 667, 672, 615, 656, 213, 215, 216, 689, 697, 699, 701, 702, 34.4, 34.6; 165/177, 180

[56] References Cited

U.S. PATENT DOCUMENTS

| | | | |
|---|---|---|---|
| 3,762,884 | 10/1973 | Grisaffe | 29/196.2 |
| 3,928,026 | 12/1975 | Hecht | 428/668 |
| 4,055,705 | 10/1977 | Stecura et al. | 428/633 |
| 4,335,190 | 6/1982 | Bill | 428/678 |
| 4,535,033 | 8/1985 | Stecura | 428/678 |
| 4,861,618 | 8/1989 | Vine | 427/34 |
| 4,933,239 | 6/1990 | Olson | 428/678 |

FOREIGN PATENT DOCUMENTS 0321427  6/1989  European Pat. Off. .

OTHER PUBLICATIONS

Research And Development Of High Temperature Materials For Industry, Elsevier Applied Science, 1989.

*Primary Examiner*—Ellis P. Robinson
*Assistant Examiner*—Timothy M. Speer
*Attorney, Agent, or Firm*—Webb Ziesenheim Bruening Logsdon Orkin & Hanson

[57] ABSTRACT

A heat radiating tube for an annealing furnace is disclosed. An aluminide layer and an aluminum diffusion sublayer are formed by an aluminum diffusion coating method on one side or both sides of the tube portions which are subjected during use to high temperature oxidation corrosion. Subsequently, a coating of MCrAlY is applied on selected inside portions exposed to the combustion gas flame collision in order to reinforce the bonding strength of the protective coating. A layer of ceramic is then coated thereupon. Prior to applying the MCrAlY and ceramic coatings, the tube surface to be coated is ground to a depth equal to the coating thicknesses in order to make the heights of the coated layer and the surface of the remaining portions of the tube even each other.

9 Claims, 1 Drawing Sheet

HEAT RADIATING TUBE FOR ANNEALING FURNACE, WITH CERAMIC COATED ON THE INSIDE THEREOF

FIELD OF THE INVENTION

The present invention relates to a heat radiating tube burner for an annealing furnace, of the type in which heat treatment is carried out by indirect heating utilizing a fuel gas combustion heat. More particularly, the invention relates to a heat radiating tube which is resistant to high temperature oxidation corrosion.

BACKGROUND OF THE INVENTION

A heat radiating tube as a component of a heat radiating tube burner for an annealing furnace is exposed to a high temperature combustion gas and, therefore, the thickness of the radiating tube is markedly reduced due to the occurrence of high temperature oxidation corrosion on the inside of the heat radiating tube. As a result the life expectancy of the heat radiating tube is shortened. Heretofore, in an effort to inhibit such high temperature oxidation corrosion, the heat radiating tube conventionally is made of a Fe-Cr-Ni heat resistant cast alloy, including over 20% of Cr and 10–35% of Ni, so that a $Cr_2O_3$ protecting oxide-film is formed on the surface thereof. (Reference: J. J. Jones, "Development in Heat-resisting Alloys for Petrochemical Plant", Research and Development of High Temperature Materials for Industry, Elsevier Applied Science, p.31, 1989).

However, the $Cr_2O_3$ oxide products are vaporized in the form of $CrO_3$ at temperatures over 900° C., and therefore, there is a limit in using $Cr_2O_3$ as the material for the protecting oxide film of the heat radiating tube which is exposed to a high temperature combustion gas.

In order to solve the above described problem of the $Cr_2O_3$ protecting film, there has been developed a Fe-CrAl alloy which forms a stable $Al_2O_3$ even at temperatures over 900° C. In addition, an FeCrAlX alloy has been developed in which the adhesive strength of the $Al_2O_3$ is improved. (Related patent: SE874859).

Further, in order to achieve a sustained formation of the $Al_2O_3$ protecting film on the surface, an aluminum diffusion coating method is used. (related patent: U.S. Pat. No. 3,762,884).

However, in the case where the radiating tube is constituted in a W-shaped form as shown in FIG. 1, the combustion gas which is burned in a burner 1 of FIG. 1 flows in parallel with the inside surface of the tube during the passage through a straight tube portion 2. However, during the passage through a curved portion 3, the gas flow rates for the radially outer portion of the curved tube portion and the radially inner portion of the curved tube portion differ from each other. Accordingly, due to the difference between the gas flow rates, the combustion gas cannot flow in parallel with the inside surface of a second straight tube portion 4 at the initial portion thereof. As a result, a combustion gas flame collision phenomenon occurs at the upper initial portion 5 of the second straight portion of the W-shaped heat radiating tube.

Further, due to the instability of the combination between the fuel gas and air in the burner, the aforementioned combustion gas flame collision phenomenon can occur also in the first straight tube portion 1. Thus the portions where the flame collisions occur are subjected to a high temperature, and undergo an extremely severe thermal stress. Consequently, the $Cr_2O_3$ or $Al_2O_3$ protecting films which are formed on the inside of the tube gradually are destroyed, which then causes a rapid reduction in the tube thickness due to the oxidation corrosion. Ultimately, that the flame collision portions produce holes. Thus, the prior heat resistant alloys using a protective oxide films, as well as the metal diffusion coating method for improving the formation efficiency of the protecting films, have a limit in preventing high temperature oxidation corrosion caused by the combustion gas flame collision phenomenon.

SUMMARY OF THE INVENTION

It is an object of the present invention to provide an improved heat radiating tube for an annealing furnace in which high temperature oxidation corrosion can be effectively prevented.

In achieving this object, the heat radiating tube according to the present invention is such that selected portions undergoing a rapid reduction of the thickness due to the high temperature oxidation corrosion resulting from high temperature combustion gas exposure, are coated with aluminum by a diffusion coating method. The inside surfaces of the tube where gas flame collision occurs are also coated with a plasma sprayed ceramic.

Further, according to the present invention, aluminide layers and aluminum interdiffused sublayers are formed by using an aluminum diffusion coating method on a first straight portion, a first curved portion, a second straight portion, i.e., those portions in which the thickness is rapidly reduced due to high temperature oxidation corrosion. In addition, the inside surfaces where combustion gas flame collision occurs are also coated with MCrAlY (M=Ni,Fe,Co), and subsequently coated with a ceramic, thereby forming a curved heat radiating tube.

The aluminum diffusion coating is conducted at 800°–1100° C. in the presence of an inert gas or a reducing gas. The heat radiating tube (to be treated) is first inserted into a mixture of powders including $Al_2O_3$ powders as a sintering preventing agent, aluminum or aluminum alloy powders, and activating powders such as NH4Cl or NH4F. FIG. 2 illustrates an aluminum diffusion sublayer 10 and an aluminide layer 9 of (Ni,-Fe)Al which are formed by using an aluminum diffusion coating method.

If such aluminum diffusion coating layers are formed on the tube surfaces, sustained supply of aluminum is provided which is required for forming a stable aluminum protecting film for service at temperatures of over 900% C. Therefore, not only is the reduction of the thickness due to the high temperature oxidation corrosion inhibited, but also the scale deposit which is produced at high temperature can be prevented from forming at the entrance of the straight portion of the tube after passing through the curved portion. Consequently, the concentration of heat at the upstream portions due to the heat insulating effect of the deposited scale can be prevented.

Further, the aluminum diffusion coating can be performed only on the inside surfaces.

Further, in order to prevent the damage due to the high temperature oxidation corrosion which can not be overcome by means of metals, a ceramic layer is applied by a plasma spray coating method. The plasma spray coating method is also used in the manufacture of aircraft turbines, and this ceramic plasma spray coating method has greatly improved the performance of such engines. (Related patents U.S. Pat. No. 4,055,705, JP 63118059, U.S. Pat. No. 4,861,618).

However, the plasma spray coating of ceramics in the aircraft turbine presents no problem because the entire inside surface of the turbine is coated. However, in cases where the coating is applied locally only on the flame collided portions, as in the case of the heat radiating tube, the ceramic coated portions project from the surface of the tube. Therefore, if the surface is subjected to thermal stress, the edges of the coated layer rapidly detach from the base. Such a problem also occurs in a U shaped tube which consists of a combustion burner 1, a first straight tube portion 2, a first curved tube portion 3 and a second straight tube portion 4 as shown in FIG. 1.

The present invention overcomes this problem, as described below. In order to reinforce the bonding strength between a ceramic coating layer 12 and a base 4', an MCrAlY coating layer 11 is formed prior to forming the ceramic layer 12. In order to prevent the detachment of the edges of the ceramic coating layer, the height of the coated layer is even with the inside of the heat radiating tube.

To describe it in more detail, the inside surface of the heat radiating tube on which the aluminum diffusion coating is formed is ground by pressure-blowing alumina powders prior to performing the plasma spray coating. Here, the grinding depth is determined such that the plasma spray coating layer should not project above the surface of the heat radiating tube. Thus, the surface of the coated layer and the inside surface of the heat radiating tube should be even. Thus, if a pretreatment is carried out by means of the alumina powders on the surface to be coated, not only the bonding strength is reinforced, but also the detachment of the coated layer can be prevented. Here, the alumina powders have a particle size distribution of 150–1100 μm by taking into account the particle size distribution of the MCrAlY coating powders. The MCrAly coating is carried out using MCrAlY powders having a particle size distribution of 10–90 μm and by applying the plasma spraying method. In forming the MCrAlY powders, the proportions of the ingredient elements are not necessarily restricted. The ceramic coating is carried out by plasma-spraying ceramic powder having a particle size distribution of 10–75 μm. ZrO2 is used as the ceramic powder after stabilizing it by means of a stabilizing agent including Y2O3, MgO and CaO, with the proportions of the stabilizing agent being not necessarily restricted. If a combustion gas flame colliding portion is formed near a welded portion 6 close to a curved portion as shown in FIG. 1, the plasma spay coating is carried out in such a manner that a portion 13 between an initial straight tube portion 8 and a plasma spray coating portion is shielded during the plasma spray coating as shown in FIG. 2, so that there should be no difficulty in welding the curved portion after carrying out the plasma spray coating. The length of the shielded portion 13 is desirably 10–20 mm.

If the aluminum diffusion coating is applied as described above on the surface of the heat radiating tube where the thickness is rapidly reduced due to the high temperature oxidation corrosion, the high temperature oxidation corrosion due to the high temperature combustion gas can be inhibited. In addition, the heat concentration on the upstream portion of the tube heretofore caused by corrosion scale deposition is prevented.

On the tube portions where combustion gas flames collide, a surface grinding is performed by pressure-blowing alumina powders. Subsequently a ceramic and MCrAlY are coated by a plasma spraying method. Thus, even if combustion gas flame collisions occur, the temperature of the heat radiating tube is not only lowered owing to the heat-insulating effect of the ceramic coating layer, but also the ceramic coating layer is kept from being detached even under a thermal stress. Thus, local destruction of the heat radiating tube which is subjected to a severe corroding action can be effectively prevented. The thickness of the MCrAlY coating layer is desirably 10–100 μm, and the thickness of the ceramic layer is desirably 50–250 μm. In the case of a W shaped heat radiating tube for an annealing furnace, which is an embodiment of the present invention, some work is done before forming the welding portion 6. The first straight portion 2 is first welded, then the first curved portion 3, the second straight portion 4 and the second curved portion 7 as shown in FIG. 1. As shown in FIG. 2, an aluminide layer 9 and an aluminum diffusion sublayer 10 are formed on one side or both side surfaces of the first straight portion 2, the first curved portion 3, and the second straight portion 4 of the heat radiating tube which are subjected to a rapid reduction of thickness. Further, an MCrAlY coating layer 11 and a ceramic coating layer 12 are formed on the inside surface portions 5 where the combustion gas flame collision occurs. As shown in FIG. 2, the MCrAlY coating layer 11 is formed directly on the aluminum diffusion sublayer 10.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Example 1

Figure 1:
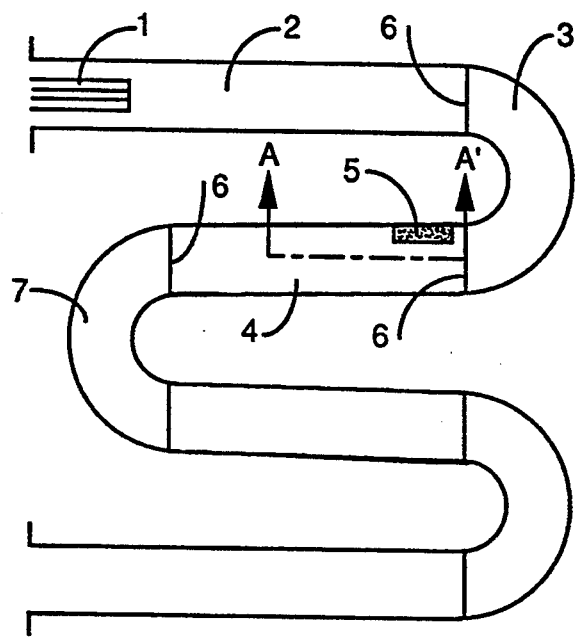
FIG. 1 is a schematical view of a W shaped heat radiating tube.
Figure 2:
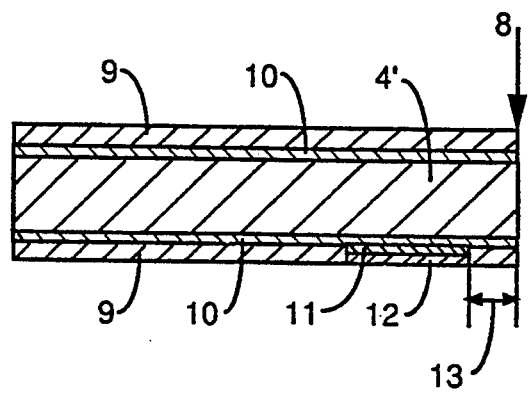
FIG. 2 is an enlarged sectional view taken along the line A—A' of FIG. 1, showing the portions of the tube where combustion gas flame collisions occur.

Test pieces having the dimensions of 4 mm(thickness)×50 mm (lateral)×50 mm (longitudinal) were prepared. The test pieces had compositions shown in Table 1 below.

TABLE 1

| material No. | C | Si | Mn | P | S | Ni | Cr | Mo | Fe |
|---|---|---|---|---|---|---|---|---|---|
| | | | | | | | (Unit: weight %) | | |
| I | 0.4 | 1.7 | 1.4 | 0.01 | 0.01 | 20.5 | 25 | 0.4 | bal |
| II | 0.4 | 1.6 | 1.5 | 0.01 | 0.01 | 35 | 24 | 0.35 | bal |

1) Aluminum diffusion coating: The mixture powder for the aluminum diffusion coating consisted of 3% of NH4Cl, 5% of Al powder and 92% of Al2O3. The diffusion heat treatment was carried out for 10 hours at a temperature of 900° C. under an atmosphere of Ar gas.

2) Grinding by pressure-blowing alumina powders: A grinding operation was conducted on the test piece upon which the aluminum diffusion coating had been applied. The grinding was performed by pressure-blowing alumina powders. In order to assure that the plasma coating layer should not project above the surface of the heat radiating tube, the grinding was concentrated on an area of 45 mm (lateral)×45 mm (longitudinal) of the test piece and down to a depth of 120 μm.

Conditions of the Grinding

Particle size of alumina: 500 μm
Air pressure: 5–10 kg/cm$^2$
Surface roughness: Rmax60

3) Plasma Spray coating: After completing the step, a plasma spray coating operation was performed under the following conditions. A shielding means was used to insure that only the ground portion would be plasma spray coated.

Plasma Spray Conditions

Plasma gas: primary gas Ar, 35–47 SLPM (standard liter/minute), 5 kg/cm$^2$, secondary gas H$_2$, 8–14 SLPM, 5 kg/cm$^2$
Powder gas: Ar, 2.3–2.6 SLPM, 5 kg/cm$^2$, Supply rate 10% rpm
Spraying distance: 100–125 mm
Preheating: 50°–80° C.
Coating thickness: primary 20 μm, secondary 100 μm
Spraying material: 3 kinds of materials were used as shown in Table 2 below.

TABLE 2

| Material No. | Powders for primary coating (MCrAlY layer) | | Powders for secondary coating (ceramic layer) | |
|---|---|---|---|---|
| | Composition | Particle size | Composition | Particle size |
| No. 1 | Ni-19Cr-6Al-0.5Y | 10–90 μm | ZrO$_2$ + 8Y$_2$O$_3$ | 10–106 μm |
| No. 2 | Co-23Cr-1.3Al-0.5Y | 10–90 μm | ZrO$_2$ + 8Y$_2$O$_3$ | 10–106 μm |
| No. 3 | Ni-10Cr-6Al-0.5Y | 10–90 μm | ZrO$_2$ + 24MgO | 10–106 μm |

Example 2

The high temperature resisting characteristics were evaluated for the test piece having only the aluminum diffusion coating. The test piece having the plasma spray coating and the aluminum diffusion coating was also tested for high temperature resistance.

1) Test for high temperature resisting characteristics on the test piece with the aluminum diffusion coating: Test pieces with a coating and without a coating were kept in an atmosphere consisting of COG (cokes oven gas) and air (mixed at a ratio of 1:1.1) at a temperature of 1100° C. for 45 minutes, and at the room temperature for 15 minutes. This cycle was carried out 500 times, and then, the high temperature resisting characteristics were evaluated based on the variations of the weight after the test relative to the weight before the test. The test results are reported in Table 3 below.

Table 3 shows that the test piece having the aluminum diffusion coating is superior relative to the uncoated material in high temperature resisting characteristics. It is clear that it is difficult to prevent high temperature oxidation corrosion with an uncoated heat resisting material.

TABLE 3

| Method | Aluminum diffusion coating | Test piece | |
|---|---|---|---|
| | | I | II |
| Present invention | Done | 10 | 9 |
| Conventional | Not done | 100 | 100 |

Note:
In the above table, the decrease of the weight of the uncoated test piece of the conventional method is assumed to be 100. The test results for the test piece of the present invention are shown in the proportionate terms.

2) Test for high temperature resisting characteristics on the test piece having a plasma spray coating and an aluminum diffusion coating: After mixing COG and air at a ratio of 1:1.1, the combustion gas flames were collided vertically on the surfaces of the test pieces with and without the coatings for 500 hours. The high temperature resistance of the pieces was then evaluated based on the weight variations after the testing relative to the weight before the testing. Table 4 shows the results of the tests which were carried out in the above described manner. It is apparent from Table 4 that high temperature oxidation corrosion can be effectively prevented by employing the following processes. That is, the test piece was ground by pressure-blowing alumina powders to a depth equal to the thickness of the aluminum diffusion coating layer. A plasma spray coating according to Table 2 was applied so that the coated layer could not be detached by the thermal stress caused during the flame collision.

TABLE 4

| Method | Coating type | Test piece | |
|---|---|---|---|
| | | I | II |
| Present invention | Coating No. 1 | 5 | 4 |
| | Coating No. 2 | 5 | 4 |
| | Coating No. 3 | 7 | 7 |
| Conventional | No coating | 100 | 100 |

Note:
In the above table, the decrease of the weight of the uncoated test pieces was assumed to be 100. The test results of the test pieces of the present invention are shown in proportionate terms.

In the annealing furnace heat radiating tube of the present invention, the aluminum diffusion coating is deposited on its surface so that high temperature oxidation corrosion can be prevented and to eliminate heat concentration by preventing the deposition of corrosion scales. Further, the depth of the grinding which is carried out by pressure-blowing alumina powders prior to plasma spray coating, is adjusted in such a manner that the plasma coating layer should not project above the surface of the heat radiating tube. As a result of the grinding, the plasma coating layer is even with the tube surface. Consequently, the detachment of the plasma coating layer, which is liable to occur due to thermal stress, can be prevented. That is, the MCrAlY and ceramic coatings are applied on localized portions of the tube by the plasma spraying method, so that localized destruction caused by the colliding flames is prevented, thereby extending the life expectancy of the heat radiating tube. Further, the prevention of localized destruction of the heat radiating tube, caused by colliding flames, provides economy to manufacturing a high temperature resistant and corrosion resistant superior heat radiating tube. Heretofore, uncoated alloy materials could not withstand such localized destruction.

Further, the manufacturing method of the present invention is not adversely affected by the alloy composition of the tube metal, or by the chemical composition of the coating materials.

What is claimed is:

1. A heat radiating tube having reduced high temperature oxidation and corrosion for use in an annealing furnace, comprising:
    a hollow metal tube having interior and exterior surfaces;
    an aluminum diffusion sublayer (10) formed on at least the interior surface of said tube;
    an aluminide layer (9) formed on said aluminum diffusion sublayer (10) except at interior surface portions of said aluminum diffusion sublayer (10) where combustion gas flames collide;
    an MCrAlY coating layer (11) (where M=Ni, Fe, or Co) formed directly on said interior surface portions of said aluminum diffusion sublayer (10) where combustion gas flames collide; and
    a ceramic coating layer (12) consisting essentially of $ZrO_2$ stabilized with $Y_2O_3$, MgO or CaO formed on said MCrAlY coating layer (11).

2. The heat radiating tube for an annealing furnace as claimed in claim 1 wherein said aluminide layer (9) is composed of (Ni,Fe)Al.

3. The heat radiating tube for an annealing furnace as claimed in claim 2, wherein said heat radiating tube is U-shaped.

4. The heat radiating tube for an annealing furnace as claimed in claim 2, wherein said heat radiating tube is W-shaped.

5. The heat radiating tube for an annealing furnace as claimed in claim 1, wherein the thickness of said MCrAlY coating layer (11) is 10–100 μm, and that of said ceramic coating layer (12) is 50–150 μm.

6. The heat radiating tube for an annealing furnace as claimed in claim 5, wherein said heat radiating tube is U-shaped.

7. The heat radiating tube for an annealing furnace as claimed in claim 5, wherein said heat radiating tube is W-shaped.

8. The heat radiating tube for an annealing furnace as claimed in claim 1, wherein said heat radiating tube is U-shaped.

9. The heat radiating tube for an annealing furnace as claimed in claim 1, wherein said heat radiating tube is W-shaped.

* * * * *

UNITED STATES PATENT AND TRADEMARK OFFICE
CERTIFICATE OF CORRECTION

PATENT NO. : 5,409,748  
DATED : April 25, 1995  
INVENTOR(S) : Jin W. Song, Soon Y. Whang and Byong K. Sung It is certified that error appears in the above-indentified patent and that said Letters Patent is hereby corrected as shown below:

Title page, item [57] col. 2,  
Last line of Abstract after "even" insert --with--.

Column 1 Line 26 "oxide-film" should read --oxide film--.

Column 2 Line 4 after "Ultimately," delete "that".

Column 2 Line 5 after "holes" insert --in the tube--.

Column 2 Line 6 after "using" delete "a".

Column 2 Line 49 after "surfaces," insert --then a--.

Column 2 Line 52 "900% C." should read --900° C.--.

Column 2 Line 68 after "this" delete "ceramic".

Column 3 Line 40 "MCrAly" should read --MCrAlY--.

Column 3 Line 53 "spay" should read --spray--.

UNITED STATES PATENT AND TRADEMARK OFFICE
CERTIFICATE OF CORRECTION

PATENT NO. : 5,409,748
DATED : April 25, 1995
INVENTOR(S) : Jin W. Song, Soon Y. Whang and Byong K. Sung It is certified that error appears in the above-indentified patent and that said Letters Patent is hereby corrected as shown below:

Table 1 Column 4 Line 57, under the heading Cr, in row II, "24" should read --25--.

Column 5 Line 10 before "step," insert --grinding--.

Column 6 Line 7 "piece" should read --pieces--.

Signed and Sealed this

First Day of August, 1995

Attest:

BRUCE LEHMAN

*Attesting Officer*   *Commissioner of Patents and Trademarks*